United States Patent
Bidichandani et al.

(10) Patent No.: US 6,820,194 B1
(45) Date of Patent: Nov. 16, 2004

(54) METHOD FOR REDUCING POWER WHEN FETCHING INSTRUCTIONS IN A PROCESSOR AND RELATED APPARATUS

(75) Inventors: Sameer I. Bidichandani, Tustin, CA (US); Moataz A. Mohamed, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 676 days.

(21) Appl. No.: 09/829,823

(22) Filed: Apr. 10, 2001

(51) Int. Cl.[7] .............................. G06F 9/32; G06F 9/38; G06F 9/44
(52) U.S. Cl. ......................... 712/245; 712/24; 712/219; 712/241; 712/207; 712/248; 711/219
(58) Field of Search ......................... 712/24, 219, 241, 712/245, 207, 248, 206, 210; 711/219

(56) References Cited

U.S. PATENT DOCUMENTS 5,794,029 A * 8/1998 Babaian et al. ............. 712/241
5,926,832 A * 7/1999 Wing et al. ................. 711/141
6,182,203 B1 * 1/2001 Simar et al. .................. 712/22
6,314,509 B1 * 11/2001 Tremblay et al. ........... 712/204

* cited by examiner

*Primary Examiner*—Daniel H. Pan
(74) *Attorney, Agent, or Firm*—Farjami & Farjami LLP (57) ABSTRACT

In one disclosed embodiment an instruction loop having at least one instruction is identified. For example, each instruction can be a VLIW packet comprised of several individual instructions. The instructions of the instruction loop are fetched from a program memory. The instructions are then stored in a register queue. For example, the register queue can be implemented with a head pointer which is adjusted to select a register in which to write each instruction that is fetched. It is then determined whether the processor requires execution of the instruction loop, for example, by checking a program counter (PC) value corresponding to each instruction. When the processor requires execution of the instruction loop, the instructions are output from the register queue. For example, the register queue can be implemented with an access pointer which is adjusted to select a register from which to output each instruction that is required.

32 Claims, 4 Drawing Sheets

METHOD FOR REDUCING POWER WHEN FETCHING INSTRUCTIONS IN A PROCESSOR AND RELATED APPARATUS

BACKGROUND OF THE INVENTION

1. Field of the Invention

The present invention is generally in the field of digital signal processing ("DSP") and central processing units. In particular, the invention is in the field of very long instruction word ("VLIW") processors.

2. Background Art

VLIW processors differ from general conventional processors. One primary difference is that VLIW processors use very long instruction words which are, simply stated, a combination of instructions which are generally handled concurrently by the processor. Examples of various types of instructions are arithmetic instructions, logical instructions, branch instructions, or memory associated instructions. Each instruction type is usually assigned to one or two specific logic units for its execution (each such logic unit is appropriately called an "execution unit"). A VLIW "packet" of instructions (also referred to as a "VLIW instruction packet" or an "instruction packet" in the present application) usually includes, in addition to the combination of instructions referred to above, other information which is needed for processing that particular combination of instructions. For example, a VLIW packet may include instructions to multiply and accumulate data from two arrays of numbers, together with an instruction indicating that the multiply and accumulate instructions are to be repeated a certain number of times.

Execution of a computer program including VLIW packets residing in the computer's main memory (also referred to as the "external memory" in the present application) requires fetching each VLIW packet from the computer's main memory into the processor (also referred to as a "central processing unit" or "CPU"). The larger the program currently being used, the more often instructions must be fetched. This fetching process requires a certain number of clock phases and consumes a certain amount of power to transfer the instruction over the computer's internal data lines (also referred to as a "bus"). Therefore, the more often instructions have to be fetched from main memory, the less time the processor has available to decode and execute those instructions and the slower the speed at which the processor can finish tasks.

Furthermore, VLIW packets, which typically may be 128 bits or 256 bits long, are much longer than individual instructions, which are typically 32 bits long, used in conventional non-VLIW processors. The long VLIW packets require a greater number of interconnect lines to transfer all the individual instructions in the VLIW packet, that is, the "instruction bus" must be wider than that used in conventional non-VLIW processors. A wider bus consumes proportionately more power in direct relation to the increased width of the bus. Power consumption must be budgeted for the processor in order to avoid problems associated with excess power consumption, for example, overheating, which can lead to hardware failure. Therefore, the more often instructions have to be fetched from main memory, the more power the processor consumes fetching those instructions and the less the power available for the processor to perform other tasks.

Thus, it is desirable to set aside in a local memory, i.e. a memory requiring less time and less power to access than the main memory, a limited number of program instructions that the processor may want to fetch. An instruction cache is such a local memory. An instruction cache is a relatively small memory module where a limited number of program instructions may be stored. The processor performs constant checks to determine whether instructions stored in the main memory required by the processor are already resident in the instruction cache. If they are already resident in the instruction cache, the instruction fetch step is performed by referring to the instruction cache, since there is no need to go to the main memory to find what is already in the instruction cache.

The instruction cache approach is inadequate for a number of specific applications, such as digital signal processing or DSP, where repetition of blocks of instructions (referred to as "instruction loops" or "repeat loops") is frequently encountered. For digital signal processing, as an example, it is estimated that 80% of processor execution time is spent executing short repeat loops. Short repeat loops commonly occur, for example, in the "butterfly" portion of many Fast Fourier Transform ("FFT") algorithms, which are frequently used in digital signal processing.

Execution of a repeat loop, and in particular a short repeat loop, requires refetching each instruction before it is repeated. The constant refetching of repeated instructions consumes a substantial amount of processor time and, in view of the special considerations of bus width in VLIW processors, a substantial amount of power, even with the use of local memory techniques, such as instruction cache.

Therefore, there is a need in the art for avoiding refetching of VLIW packets which occur in short repeat loops. Also, there is a need in the art for avoiding needlessly refetching any instruction which has recently been executed in a VLIW processor, whether or not the instruction occurs in a short repeat loop. Further, there is need in the art for reducing the power consumed by instruction fetching in VLIW processors. Moreover, there is need in the art for reducing the power consumed by instruction fetching in a VLIW processor while maintaining or improving the speed and performance of the processor.

SUMMARY OF THE INVENTION

The present invention is directed to method for reducing power when fetching instructions in a processor and related apparatus. The invention overcomes the need in the art for avoiding refetching of VLIW packets which occur in short repeat loops. The invention avoids needlessly refetching any instruction which has recently been executed in a VLIW processor, whether or not the instruction occurs in a short repeat loop. Further, the invention reduces the power consumed by instruction fetching in VLIW processors while maintaining or improving the speed and performance of the processor.

According to the invention an instruction loop having at least one instruction is identified. For example, each instruction can be a VLIW packet comprised of several individual instructions. The instructions of the instruction loop are fetched from a program memory, which can be, for example, a cache or an external memory. The instructions are then stored in a register queue. For example, the register queue can be rot implemented with a head pointer which is adjusted to select a register of the register queue in which to write each instruction that is fetched.

It is then determined whether the processor requires execution of the instruction loop. When the processor requires execution of the instruction loop, the instructions are output from the register queue. For example, the register queue can be implemented with an access pointer which is adjusted to select a register of the register queue from which to output each instruction that is required. The instructions are then passed to an instruction decode unit for decoding and execution.

DETAILED DESCRIPTION OF THE INVENTION

The present invention is directed to method for reducing power when fetching instructions in a processor and related apparatus. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1:
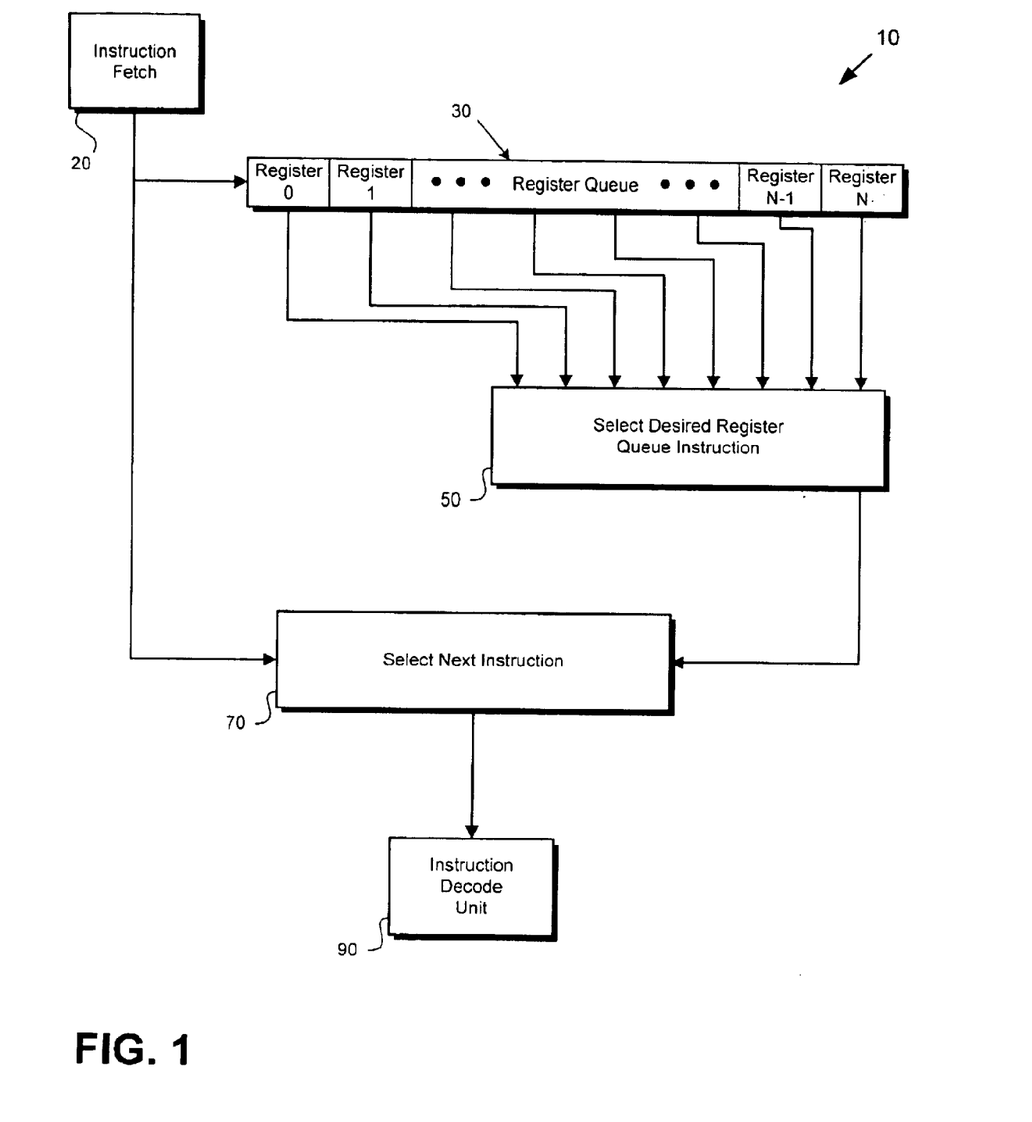
FIG. 1 is a block diagram illustrating the flow of instructions according to one embodiment of the invention.

FIG. 1 shows a block diagram of instruction pre-fetch queuing system 10 in accordance with one embodiment of the present invention. FIG. 1 conceptually illustrates the flow of VLIW packets in instruction pre-fetch queuing system 10. Although the actual flow of VLIW packets in a detailed diagram depicting a specific implementation of instruction pre-fetch queuing system 10 may vary, depending on the specific implementation, the conceptual flow of VLIW packets in instruction pre-fetch queuing system 10, depicted by the block diagram shown in FIG. 1 may nonetheless be used to describe some of the concepts used in the present invention.

As shown in the block diagram of FIG. 1, a VLIW packet in instruction pre-fetch queuing system 10 is fetched by the "instruction fetch" block 20, also referred to as an "instruction fetch module", and is passed to both register queue 30 and "select next instruction" block 70. "Instruction fetch" block 20 comprises elements which are used to fetch VLIW packets from the VLIW processor program memory, which can be for example, either the main memory or an instruction cache. In one embodiment of the invention, "instruction fetch" block 20 outputs program counter ("PC") bits in addition to individual instruction bits contained in a fetched VLIW instruction packet. For example, the instruction fetch module knows the PC value based on the state of the processor and hence can determine whether the processor requires fetching and execution of instructions stored in the program memory or whether the instructions are already resident in the register queue. "Instruction fetch" block 20 may include, for example, a delay element which ensures that the program counter bits corresponding to the address of the fetched VLIW instruction packet are outputted at the same time as the individual instructions in the VLIW packet are outputted. For example, if the VLIW instruction packet is 128 bits long and the program counter is 32 bits, the result is a sequence of 160 bits.

As shown conceptually in FIG. 1, the individual instructions in a VLIW packet and the corresponding PC bits enter register queue 30. Register queue 30 is comprised of N registers. In general, N can be any number, for example, 16 or 32. For the example used in the present application to describe one embodiment of the present invention, N is 16. As shown conceptually in FIG. 1, a new VLIW packet and its corresponding PC value, collectively referred to as a "VLIW bundle" for the purpose of easy reference in the present application, enter register queue 30. In concept, the VLIW packets and corresponding PC values which are already in register queue 30 are passed from each register to the next register as a new VLIW packet and its corresponding PC value enter register queue 30. The individual instructions in a VLIW packet and the corresponding PC bits which were in register N—the "tail" of the queue—have nowhere to go, so they are simply "lost" or overwritten. In this respect, register queue 30 is similar id concept to a "first in, first out" (FIFO) data structure, known in the art, in that the contents of register N, which is the first VLIW bundle to enter register queue 30, is the first "out" in the sense of being disposed of. Register queue 30 differs in concept from a FIFO data structure, however, in that any VLIW packet and its corresponding PC value, i.e. any VLIW bundle—not just the first one—may come "out" of any register, in the sense of being accessed for information, when register queue 30 is accessed.

Different specific implementations of a register queue can be achieved without departing from the conceptual description just given. For example, register queue 30 can be implemented as a circular bank of registers with a tracking module and an output module. The tracking module and output module are used to implement pointers, such as a head pointer and an access pointer. The head pointer points to the register at the "head" of the circular bank. A new VLIW bundle enters the circular bank at the register pointed to by the head pointer. As each new VLIW bundle is entered, the head pointer is first moved to the next register in the circle by adjusting the value of the head pointer, and the old VLIW bundle in that register, the "tail" as described above, is overwritten by the new VLIW bundle and lost. The former tail is now the head of the register queue. Any of the registers within the circular bank can be accessed for information when the circular bank is accessed. A desired VLIW bundle is accessed from the circular bank at the register pointed to by an access pointer. Further, it is known which register in the circular bank holds a desired VLIW bundle by referencing each register, i.e. calculating the position of the access pointer, relative to the current position of the head pointer around the circle.

As shown in FIG. 1, any of the N registers in register queue 30 can be accessed by "select desired register queue instruction" block 50. Thus, a VLIW bundle can be passed from any register in register queue 30 by "select desired register queue instruction" block 50 to "select next instruction" block 70. For example, suppose that registers 9 through 111 contain VLIW instruction packets which are to be executed in order, first register 9, then register 10, then register 11, and then back to register 9, etc. for a prescribed number of repetitions, for example, 5 repetitions. Then the VLIW bundles in each of registers 9, 10, and 11 can be passed to "select next instruction" block 70 and then to instruction decode unit 90 to be executed by the processor in turn for each of the 5 repetitions without performing any new instruction fetch. Thus, 15 instruction fetches and the concomitant power consumption associated with a 160 bit wide bus are saved in this example. Moreover, the overall instruction execution speed for the 5 repetitions would be at least as fast as the access time from an instruction cache or from an external memory.

As shown in FIG. 1, "select next instruction" block 70 has access to a VLIW bundle either directly from "instruction fetch" block 20 or from a desired register of register queue 30. "Select next instruction" block 70 selects one or the other VLIW bundle, according to which instruction the processor requires to be executed, and passes the selected VLIW bundle to instruction decode unit 90. For example, the PC value of each VLIW bundle can be checked to determine which instruction the processor requires to be executed, and "instruction fetch" block 20 or register queue 30 can be accessed accordingly. Instruction decode unit 90 performs the decoding required prior to execution of the VLIW packet contained in the VLIW bundle. Thus, the conceptual flow of VLIW packets in instruction pre-fetch queuing system 10 is as shown in the block diagram in FIG. 1.

Figure 2:
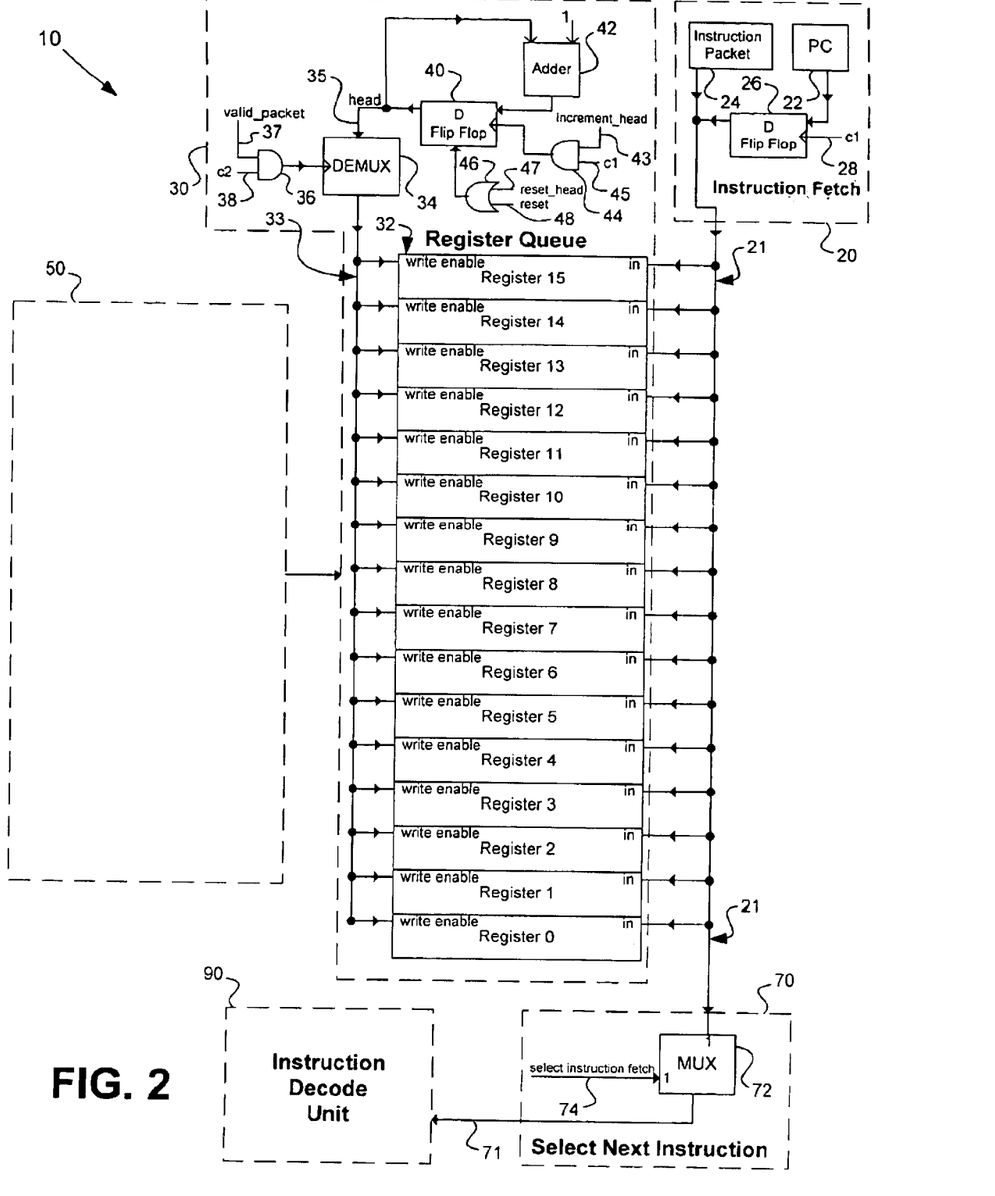
FIG. 2 is a circuit block diagram illustrating one specific implementation of a portion of the system of FIG. 1 according to one embodiment of the invention.
Figure 3:
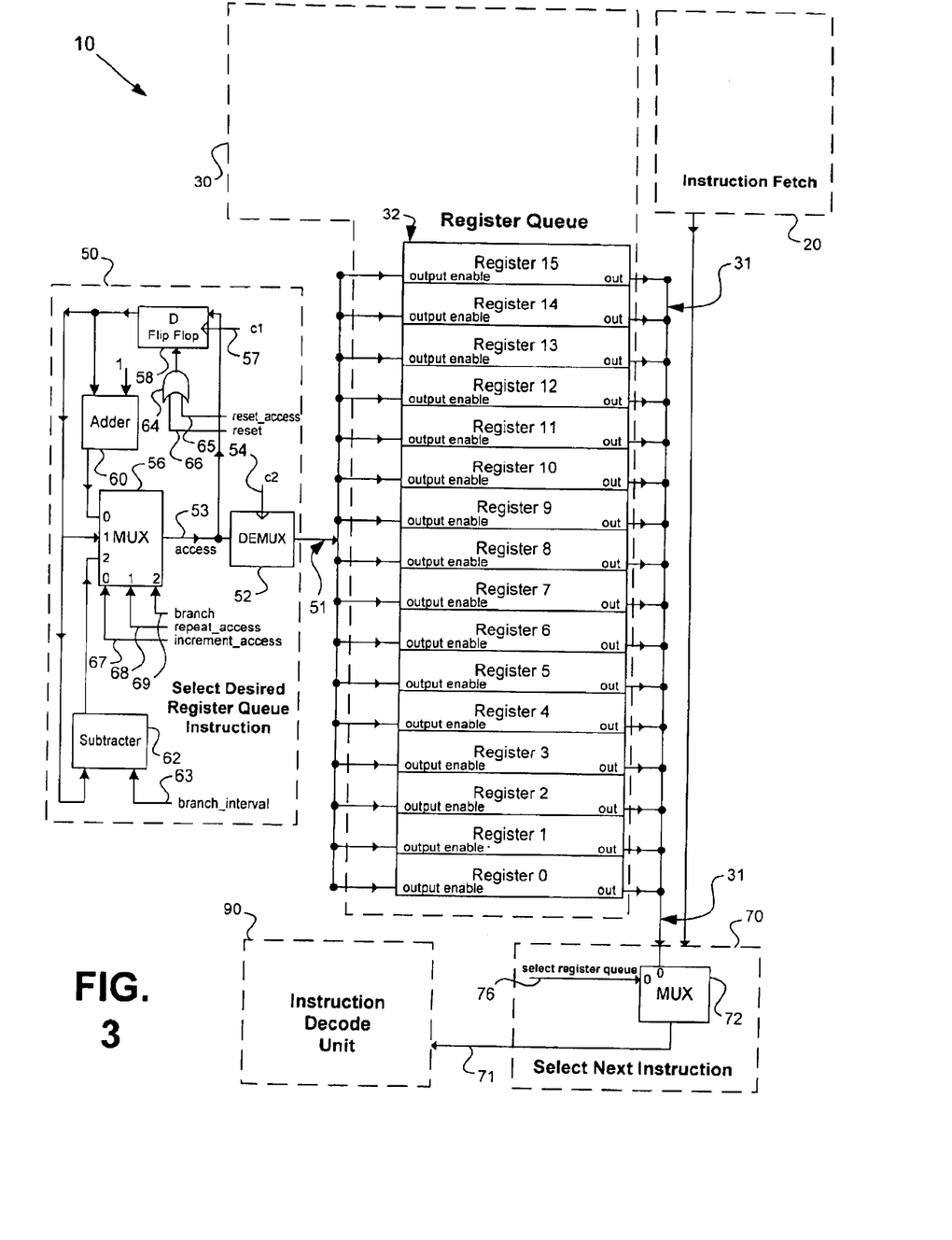
FIG. 3 is a circuit block diagram illustrating one specific implementation of another portion of the system of FIG. 1 according to one embodiment of the invention.

FIG. 2 is a circuit block diagram which shows portions of instruction pre-fetch queuing system 10 of FIG. 1 in greater detail. In particular, "instruction fetch" block 20 is shown in greater detail, and portions of register queue 30 and "select next instruction" block 70 are shown in greater detail. For completeness, "select desired register instruction" block 50 and instruction decode unit 90 are also shown, but without detail. "Select desired register instruction" block 50 and the remaining portions of register queue 30 and "select next instruction" block 70, not shown in FIG. 2, are shown in FIG. 3. The portions of register queue 30 and "select next instruction" block 70 that are not shown in FIG. 2 are explained below in connection with FIG. 3.

Referring now to FIG. 2, "instruction fetch" block 20 includes PC 22, instruction packet 24 and D flip-flop 26. In the present example, PC 22 appears as a signal on a 32 bit wide bus which feeds into D flip-flop 26. D flip-flop 26 is a standard D flip-flop, as known in the art, and is clocked on c1 clock signal 28. Typically, and as an example D flip-flop 26 holds its output until c1 clock signal 28 goes high, at which time the input to D flip-flop 26, i.e. PC 22, appears at the output of D flip-flop 26 and is typically held there until the next time c1 clock signal 28 goes high. The output of D flip-flop 26 is coupled to a 32 bit wide bus. In reality, D flip-flop 26 actually comprises 32 D single-bit flip-flops, one for each line of the 32 bit bus. Because each of the 32 flip-flops performs the same function in parallel, however, no specificity is lost by describing them all at once. Thus, D flip-flop 26 acts as a delay or time-synchronizing element so as to place the contents of PC 22 on the 32 bit wide bus coupled to D flip-flop 26 at clock cycle c1.

Instruction packet 24 appears as a signal on a 128 bit wide bus in the present example. The 128 bit wide bus carrying instruction packet 24 joins with the 32 bit wide output bus of D flip-flop 26 inside "instruction fetch" block 20 to form a 160 bit wide by bus, bus 21. The time synchronization of D flip-flop 26 ensures that the value of PC 22 is the address in program memory of instruction packet 24, i.e. that PC 22 and instruction packet 24 which matches PC 22 both appear on bus 21 at the same time. Thus, bus 21, which is 160 bits wide, carries a 160 bit long VLIW bundle in which the PC value in the VLIW bundle is the address in program memory of the VLIW instruction packet in the VLIW bundle. Also as shown in FIG. 2, bus 21 is connected to register queue 30 and "select next instruction" block 70.

Continuing with FIG. 2, register queue 30 includes a collection of registers, shown in FIG. 2 as register bank 32. Register bank 32 is implemented as a circular bank of registers, as described above. In the example used to describe one embodiment in the present invention, circular register bank 32 is a collection of 16 registers, numbered 0 through 15 in FIG. 2. Each of registers 0 through 15 is 160 bits wide, i.e. is capable of storing a 160 bit long VLIW bundle. Each of registers 0 through 15 is connected to 160 bit wide bus 21, as marked by the word "in" on each of registers 0 through 15 in FIG. 2. Each of registers 0 through 15 can receive a VLIW bundle from bus 21 when a signal goes high on its write enable line, marked by the words "write enable" on each of registers 0 through 15 in FIG. 2. Each of registers 0 through 15 is controlled by DEMUX 34 by a separate write enable line. The 16 separate write enable lines are shown collectively in FIG. 2 as a single line, line 33, with 16 branchings. Although shown as a single line with 16 branchings, it is understood that line 33 actually comprises 16 separate lines connecting DEMUX 34 to each of registers 0 through 15.

Continuing with the present example, the output of DEMUX 34 is 16 separate lines, shown in FIG. 2 as line 33 with 16 branchings. Each of the 16 separate lines is connected to the corresponding write enable line of registers 0 through 15 of circular register bank 32. The input, head signal 35, of DEMUX 34 is 4 bits on 4 separate interconnect lines marked "head" in FIG. 2. Thus, since head signal 35 is 4 bits, head signal 35 can range in value from 0 through 15, i.e. head signal 35 can have 16 different values in the present example. The function of DEMUX 34 is to select a register from register queue 30 by placing a high signal on only one of its 16 output lines, the one corresponding to the value of head signal 35. Thus, only one register at a time is selected in circular register bank 32 in which to write a VLIW bundle from bus 21. Thus, head signal 35 functions as a head pointer for circular register bank 32 so as to implement register queue 30 as a circular bank of registers, as described above in connection with FIG. 1.

DEMUX 34 is clocked by AND gate 36. That is, all 16 output lines of DEMUX 34 are held low until DEMUX 34 receives a high signal from AND gate 36, at which time a high signal appears only on the output line of DEMUX 34 corresponding to the value of head signal 35, as explained above. The output of AND gate 36 is connected to the clock input of DEMUX 34. One input of AND gate 36 is "valid_packet" signal 37. Valid_packet signal 37 is set high only when it is desired to pass a new VLIW bundle from "instruction fetch" block 20 to both register queue 30 and "select next instruction" block 70. The other input of AND gate 36 is c2 clock signal 38. The output of AND gate 36 goes high only when both valid_packet signal 37 and c2 clock signal 38 are high. Thus, a new VLIW bundle is only written to the head of register queue 30 at clock cycle c2 when valid_packet signal 37 is also high.

The input of DEMUX 34 is connected to the output of D flip-flop 40 through the 4 lines carrying head signal 35, as shown in FIG. 2. In reality, D flip-flop 40 is actually 4 D flip-flops, one for each line of head signal 35. Because each of the 4 flip-flops performs the same function in parallel, however, no specificity is lost by describing all four at once. The output of D flip-flop 40 is connected to the input of DEMUX 34. The output of D flip-flop 40 also is connected to one input of 4 bit adder 42.

One input of 4 bit adder 42 is connected to the output of D flip-flop 40. Thus, the value of one input of 4 bit adder 42 is equal to the value of head signal 35. The other input of 4 bit adder 42, marked with a "1" in FIG. 2, is connected to 4 bits whose value is always maintained equal to the numerical value 1. Thus, the value at the 4 bit output of adder 42 is equal to the value of head signal 35 plus one. In other words, the function of adder 42 is to increment the value of head signal 35 by one. The largest value that head signal 35 can reach, in the present example, is 15. Because register queue 30 is implemented as a circular bank of registers, 4 bit adder 42 is implemented so that when 1 is added to 15, the output of adder 42 is zero. In other words, adder 42 performs addition cyclically. Thus, when the head of register queue 30 has reached register 15, the next head of register queue 30 is register 0, as required to implement register queue 30 as a circular bank of registers.

It is manifest that the number of bits of adder 42 depends on the number of registers in circular register bank 32, and that adder 42 can be implemented as a cyclical adder, regardless of the number of registers in circular register bank 32. The details of how to implement adder 42 as a cyclical adder, which are apparent to a person of ordinary skill in the art, have been left out. Thus, when the head of register queue 30 has reached the last register, the next head of register queue 30 is register 0, as required to implement register queue 30 as a circular bank of registers. The output of 4 bit adder 42 is connected to the input of D flip-flop 40.

The input of D flip-flop 40 is connected to the output of 4 bit adder 42. Thus, the input of D flip-flop 40 has a value equal to the cyclically incremented value of head signal 35, as explained above. D flip-flop 40 is clocked by AND gate 44. Thus, D flip-flop 40 holds its output until the output of AND gate 44 goes high, at which time the input to D flip-flop 40, i.e. the cyclically incremented value of head signal 35, appears at the output of D flip-flop 40 and is held there until the next time the output of AND gate 44 goes high.

The output of AND gate 44 is connected to the clock input of D flip-flop 40. A first input of AND gate 44 is "increment_head" signal 43. Increment_head signal 43 is set high only when it is desired to pass a new VLIW bundle from "instruction fetch" block 20 to both register queue 30 and "select next instruction" block 70. A second input of AND gate 44 is c1 clock signal 45. The output of AND gate 44 goes high only when both increment_head signal 43 and c1 clock signal 45 simultaneously go high. Thus, the head pointer, head signal 35, of circular register bank 32 is cyclically incremented through D flip-flop 40 at clock cycle c1 only when increment_head signal 43 is set high.

As stated above, when it is desired to pass a new VLIW bundle from "instruction fetch" block 20 to both register queue 30 and "select next instruction" block 70, valid_packet signal 37 is set high. Also as stated above, a new VLIW bundle is only written to the head of register queue 30 at clock cycle c2 when valid_packet signal 37 is set high. Thus, when it is desired to pass a new VLIW bundle from "instruction fetch" block 20 to both register queue 30 and "select next instruction" block 70, both increment_head signal 43 and valid_packet signal 37 are set high. Since clock cycle c1 occurs "before" clock cycle c2, the head pointer, head signal 35, is cyclically incremented just before a new VLIW bundle is written to the head of register queue 30. In other words, when it is desired to fetch a new VLIW bundle, the head pointer of register queue 30 is first moved to a new head position at clock cycle c1, and then a new VLIW bundle is written to the new head of register queue 30 at clock cycle c2.

D flip-flop 40 also has a "clear" input, which resets the output of D flip-flop 40 to zero, as known in the art. The clear input of D flip-flop 40 is connected to the output of OR gate 46. A first input of OR gate 46 is "reset_head" signal 47. Reset_head signal 47 is set high when it is desired to reset the head pointer of register queue 30 to register 0, for example, when the processor is handling interrupts. A second input of OR gate 46 is "reset" signal 48. Reset signal 48 is also set high when it is desired to reset the head pointer of register queue 30 to register 0, for example, when the processor is started or restarted. The output of OR gate 46 goes high when either of reset_head signal 47 or reset signal 48 or both go high. Thus, the head pointer, head signal 35, of circular register bank 32 is reset to zero through D flip-flop 40, by setting either of reset_head signal 47 or reset signal 48 to high, whenever it is desired to reset the head pointer of register queue 30 to register 0.

Continuing with FIG. 2, "select next instruction" block 70 includes MUX 72. As stated above, FIG. 2 shows only a portion of "select next instruction" block 70. The =remaining portions of "select next instruction" block 70 that are not shown in FIG. 2 are shown in FIG. 3. The portions of "select next instruction" block 70 that are shown in FIG. 3 are explained below in connection with FIG. 3.

One input of MUX 72, labeled "1" in FIG. 2 is connected to 160 bit wide bus 21. The corresponding enable line of MUX 72, also labeled "I" in FIG. 2, is "select_instruction_fetch" signal 74. The other input of MUX 72 is not shown in FIG. 2, but is shown in FIG. 3 below. The output of MUX 72 is connected to 160 bit wide bus 71. One function of MUX 72 is to transfer a VLIW bundle, which in the example used in the present application is 160 bits long, from 160 bit wide bus 21 to 160 bit wide bus 71 when select_instruction_fetch signal 74 goes high. As shown in FIG. 2, bus 71 is connected to instruction decode unit 90.

As shown in FIG. 2, "select next instruction" block 70 has access to a VLIW bundle directly from "instruction fetch" block 20. When it is desired to retrieve a VLIW bundle directly from "instruction fetch" block 20, i.e. the desired VLIW instruction packet is to be newly fetched from program memory, select_instruction_fetch signal 74 is set high. Increment_head signal 43 and valid_packet signal 37 are also set high. On clock cycle c1, PC 22 is output to bus 21, and instruction packet 24 is also on bus 21, so that the desired VLIW bundle appears on bus 21 as well as on bus 71. Also on clock cycle c1, head signal 35 is cyclically incremented, i.e. the head pointer of register queue 30 is moved to a new head position. Then on clock cycle c2, the desired VLIW bundle is in written to the new head of register queue 30, i.e. register queue 30 is updated to hold the desired VLIW bundle at the head of register queue 30. Note that, as the VLIW instruction packet in the desired VLIW bundle is about to be executed, register queue 30 will always contain the 16 most recently executed instruction packets. Thus, "select next instruction" block 70 selects the desired VLIW bundle and passes the selected VLIW bundle to instruction decode unit 90. As stated above, instruction decode unit 90 performs the decoding required prior to execution of the VLIW instruction packet contained in the desired VLIW bundle.

FIG. 3 is a circuit block diagram which shows portions of instruction pre-fetch queuing system 10 of FIG. 1 in greater detail. In particular, "select desired register instruction" block 50 is shown in greater detail, and portions of register queue 30 and "select next instruction" block 70 are shown in greater detail. For completeness, "instruction fetch" block 20 and instruction decode unit 90 are also shown, but without detail. "Instruction fetch" block 20 and the remaining portions of register queue 30 and "select next instruction" block 70, not shown in FIG. 3, are shown in FIG. 2. The portions of register queue 30 and "select next instruction" block 70 that are not shown in FIG. 3 are explained above in connection with FIG. 2.

Referring now to FIG. 3, register queue 30 includes a collection of registers, shown in FIG. 3 as circular register bank 32. In the example used to describe one embodiment in the present application, circular register bank 32 is a collection of 16 (3 registers, numbered 0 through 15 in FIG. 3. Each of registers 0 through 15 is 160 bits wide, i.e. is capable of storing a 160 bit long VLIW bundle. Each of registers 0 through to 15 is connected to 160 bit wide bus 31, as marked by the word "out" on each of registers 0 through 15 in FIG. 3. Each of registers 0 through 15 can output a 160 bit VLIW bundle to bus 31 only when a signal goes high on its output enable line, marked by the (3 words "output enable" on each of registers 0 through 15 in FIG. 3. Each of registers 0 through 15 is connected to DEMUX 52 (shown in "select desired register queue instruction" block 50) by its own separate output enable line. The 16 output enable lines are shown collectively in FIG. 3 as a single line, line 51, with 16 branchings. Although shown as a single line with 16 branchings, it is understood that line 51 actually comprises 16 separate lines connecting DEMUX 52 separately to each of registers 0 through 15.

Continuing with FIG. 3, "select desired register queue instruction" block 50 includes DEMUX 52. In the present example, the output of DEMUX 52 is 16 separate lines, shown in FIG. 3 as line 51 with 16 branchings. Each of the 16 separate lines is connected to the corresponding output enable line of registers 0 through 15 of circular register bank 32. The input, access signal 53, of DEMUX 52 is 4 bits on 4 separate interconnect lines which are represented collectively as a single line marked "access" in FIG. 3. Thus, since access signal 53 is 4 bits, access signal 53 can range in value from 0 through 15, i.e. access signal 53 can have 16 different values in the present example. The function of DEMUX 52 is to select a register from register queue 30 by placing a high signal on only one of its 16 output lines, the one corresponding to the value of access signal 53. Thus, only one register at a time in circular register bank 32 is selected for outputting a VLIW bundle to bus 31. As such, access signal 53 functions as an access pointer for circular register bank 32 so as to implement register queue 30 as a circular bank of registers, as described above in connection with FIG. 1.

DEMUX 52 is clocked by c2 clock signal 54. That is, c2 clock signal 54 is connected to the clock input of DEMUX 52. Typically, and as an example, all 16 output (3 lines of DEMUX 52 are held low until c2 clock signal 54 goes high, at which time a high signal appears only on the output line of DEMUX 52 corresponding to the value of access signal 53, as explained above. Thus, a desired VLIW bundle is accessed at the position of the access pointer of register queue 30 only at clock cycle c2. The input of DEMUX 52 is connected to the output of MUX 56 through the 4 lines carrying access signal 53, as shown in FIG. 3.

Continuing with FIG. 3, "select desired register queue instruction" block 50 also includes D flip-flop 58. The input of D flip-flop 58 is also driven by the output of MUX 56 through the 4 lines carrying access signal 53, as shown in FIG. 3. In reality, D flip-21 flop 58 is actually 4 D flip-flops, one for each line of access signal 53. Because each of the 4 flip-flops performs the same function in parallel, however, no specificity is lost by describing all four at once. Thus, the input of D flip-flop 58 has value equal to the value of access signal 53. D flip-flop 58 is clocked by c1 clock signal 57. Typically, and as an example, D flip-flop 58 holds its output until c1 clock signal 57 goes high, at which time the input to D flip-flop 58, i.e. the value of access signal 53, appears at the output of D flip-flop 58 and is typically held there until the next time c1 clock signal 57 goes high. The output of D flip-flop 58 is connected to one input of 4 bit adder 60. The output of D flip-flop 58 also is connected to one 4 line input of MUX 56, i.e. the 4 line input of MUX 56 labeled "1" in FIG. 3. The output of D flip-flop 58 also is connected to one input of 4 bit subtracter 62.

D flip-flop 58 also has a clear input, which resets the output of D flip-flop 58 to zero, as known in the art. The clear input of D flip-flop 58 is driven by the output of OR gate 64. A first input of OR gate 64 is "reset_access" signal 65. Reset access signal 47 is set high when it is desired to reset the access pointer of register queue 30 to register 0, for example, when the processor is handling interrupts. A second input of OR gate 64 is "reset" signal 66. Reset signal 66 is also set high when it is desired to reset the access pointer of register queue 30 to register 0, for example, when the processor is started or restarted. The output of OR gate 64 goes high when either of reset_access signal 65 or reset signal 66 or both go high. Thus, the access pointer, access signal 53, of circular register bank 32 is reset to zero through D flip-flop 58, by setting either of reset_access signal 65 or reset signal 66 to high, whenever it is desired to reset the access pointer of register queue 30 to register 0.

Continuing with FIG. 3, "select desired register queue instruction" block 50 also includes 4 bit adder 60. A first input of 4 bit adder 60 is connected to the output of D flip-flop 58. As stated above, the value of access signal 53, appears at the output of D flip-flop 58 at clock cycle c1 and is typically held there until the next time c1 clock signal 57 goes high. Thus, the value of the first input of 4 bit adder 60 is equal to the value of access signal 53. A second input of 4 bit adder 60, marked with a "1" in FIG. 3, is connected to 4 bits whose value is always maintained equal to the numerical value 1. Thus, the value at the 4 bit output of adder 60 is equal to the value of access signal 53 plus one. In other words, the function of adder 60 is to increment the value of access to signal 53 by one.

The largest value that access signal 53 can reach, in the present example, is 15. Because register queue 30 is implemented as a circular bank of registers, 4 bit adder 60 is implemented so that when 1 is added to 15, the output of adder 60 is zero. In other words, adder 60 performs addition cyclically. Thus, when the access pointer of register queue 30 has reached register 15, and it is desired to access the next register in circular register bank 32, the access pointer of register queue 30 is moved to register 0 by adjusting the value of access signal 53 to 0, as required to implement register queue 30 as a circular bank of registers. It is manifest that the number of bits of adder 60 depends on the number of registers in register bank 32, and that adder 60 can be implemented as a cyclical adder, regardless of the number of registers in circular register bank 32. The details of how to implement adder 60 as a cyclical adder, which are apparent to a person of ordinary skill in the art, have been left out. Thus, when the access pointer of register queue 30 has reached the last register, and it is desired to access the next register in circular register bank 32, the access pointer of register queue 30 is moved to register 0, as required to implement register queue 30 as a circular bank of registers. The output of 4 bit adder 60 is connected to one 4 line input of MUX 56, i.e. the 4 line input of MUX 56 labeled "0" in FIG. 3.

Continuing with FIG. 3, "select desired register queue instruction" block 50 also includes 4 bit subtracter 62. One input of 4 bit subtracter 62 is connected to the output of D flip-flop 58. As stated above, the value of access signal 53, appears at the output of D flip-flop 58 at clock cycle c1 and is held there until the next time c1 clock signal 57 goes high. Thus, the value of a first input of 4 bit subtracter 62 is equal to the value of access signal 53. A second input, branch interval 63, of 4 bit subtracter 62 is 4 separate lines marked "branch_interval" in FIG. 3. Thus, branch interval 63 is 4 bits, so branch interval 63 can range in value from 0 through 15, i.e. branch interval 63 can have 16 different values in the present example. Thus, the value at the 4 bit output of subtracter 62 is equal to the value of access signal 53 minus the value of branch interval 63. In other words, the function of subtracter 62 is to subtract the value of branch interval 63 from the value of access signal 53.

In the present example, access signal 53 ranges in value from 0 through 15, i.e. access signal 53 can have any value between 0 and 15, inclusive. Branch interval 63 ranges in value from 1 through 15, i.e. branch interval 63 can have any value between 1 and 15, inclusive. Because register queue 30 is implemented as a circular bank of registers, 4 bit subtracter 62 is implemented so that when a larger value is subtracted from a smaller value the result is adjusted by adding 16 to the result. Thus, the output of 4 bit subtracter 62 is always in the range from 0 through 15. In other words, subtracter 62 performs subtraction cyclically. It is manifest that the number of bits of subtracter 62 depends on the number of registers in register bank 32, and that subtracter 62 can be implemented as a cyclical subtracter, regardless of the number of registers in circular register bank 32. The details of how to implement subtrdcter 62 as a cyclical subtracter, which are apparent to a person of ordinary skill in the art, have been left out.

By way of two illustrative examples, when 2 is subtracted from 5, subtracter 62 gives a result of 3. When 5 is subtracted from 2, subtracter 62 gives a result of 13. Continuing with the second of the two illustrative examples, when the access pointer of register queue 30 has reached register 2, and it is desired to access the fifth register behind register 5 in circular register bank 32, the access pointer of register queue 30 is moved back 5 registers to register 13, as required to implement register queue 30 as a circular bank of registers. Thus, subtracter 62 calculates where to move the access pointer of register queue 30 whenever it is desired to access the next register at any particular interval, within the circular bank of registers, from the current access pointer. The output of 4 bit subtracter 62 is connected to one 4 line input of MUX 56, i.e. the 4 line input of MUX 56 labeled "2" in FIG. 3.

Continuing with FIG. 3, "select desired register queue instruction" block 50 also includes MUX 56. A first input of MUX 56, labeled "0" in FIG. 3 is connected through 4 lines to the output of 4 bit adder 60. The corresponding enable line of MUX 56, also labeled "0" in FIG. 3, is "increment_ access" signal 67. A second input of MUX 56, labeled "1" in FIG. 3 is connected through 4 lines to the output of D flip-flop 58. The corresponding enable line of MU11×56, also labeled "1" in FIG. 3, is "repeat_access" signal 68. A third input of MUX 56, labeled "2" in FIG. 3 is connected through 4 lines to the output of 4 bit subtracter 62. The corresponding enable line of MUX 56, also labeled "2" in FIG. 3, is "branch" signal 69. The output of MUX 56 is connected to the 4 separate lines carrying access signal 53, which is the input of DEMUX 52. The output of MUX 56 is also connected to the input of D flip-flop 58. The function of MIUX 56 is to transfer the value of one of its inputs to its output when the corresponding enable line goes high. Thus, at most one of increment_access signal 67, repeataccess signal 68, and branch signal 69 can be set high at any one time.

For example, when a VLIW bundle has been accessed from register queue 30 and ? it is desired to execute the next VLIW bundle held in register queue 30, increment_access r: signal 67 is set high. MUX 56 then passes the corresponding input, labeled "0" in FIG. 3, to its output. It is recalled that input "0" of MUX 56 is the value of access signal 53 incremented by one, i.e. the value one has been cyclically added to access signal 53, which is updated at clock cycle c1. Thus, at clock cycle c2, DEMUX 52 enables the output of the next register in register queue 30 and the VLIW bundle in that register appears on bus 31. In other words, when increment_access signal 67 is set high, VLIW bundles can be executed in the sequence in which they are held in register queue 30.

As a second example, when a VLIW bundle has been accessed from register queue 30 and it is desired to execute the same VLIW bundle again from register queue 30, repeat_access signal 68 is set high. MUX 56 then passes the corresponding input, labeled "1" in FIG. 3, to its output. It is recalled that input "1" of MUX 56 is simply the previous value of access signal 53, which has been held constant by passing it through D flip-flop 58 at clock cycle c1. Thus, at clock cycle c2, DEMUX 52 enables the output of the same register in register queue 30 that was previously accessed and the VLIW bundle in that register again appears on bus 31. In other words, when repeat_access signal 68 is set high, one VLIW bundle held in register queue 30 can be executed repeatedly.

As a third example, when a VLIW bundle has been accessed from register queue 30 and it is desired to execute some specific VLIW bundle, which is already held in register queue 30, branch signal 69 is set high and the number of registers which must be skipped over to access the desired register is set as the value of branch interval 63. MUX 56 then passes the corresponding input, labeled "2" in FIG. 3, to its output. It is recalled that input "2" of MUX 56 is the value of access signal 53 decremented by branch interval 63, i.e. branch interval 63 is cyclically subtracted from access signal 53, which is updated at clock cycle c1. Thus, at clock cycle c2, DEMUX 52 enables the output of the desired register in register queue 30 and the VLIW bundle in that register appears on bus 31. In other words, when branch signal 69 is set high, the execution of a desired VLIW bundle held in register queue 30 can be repeated.

In the present example, 16 registers are used to implement register queue 30. The value of branch interval 63 is determined by the number of VLIW bundles held in register queue 30 for a repeat loop of VLIW instruction packets contained in the VLIW bundles. First a repeat loop is identified, and then the value of branch interval 63 is determined according to the number of VLIW bundles containing the repeat loop. For example, when the value of branch interval 63 is set equal to one, register queue 30 holds two VLIW bundles to be executed in a repeat loop, and so forth for values of branch interval 63 up to fifteen. When the value of branch interval 63 is set equal to fifteen, all sixteen registers of register queue 30 hold VLIW bundles to be executed in a repeat loop. The special case of a repeat loop with only one VLIW instruction packet, i.e. only one VLIW bundle, is accommodated in the present example by setting repeat_access signal 68 to high, instead of using a branch interval of zero. In the present, example, then, the maximum size of a repeat loop which can be accommodated by register queue 30 is 16 VLIW packets. Thus, the maximum size of a repeat loop which can be accommodated by register queue 30 is determined by the number of registers in register queue 30. It is manifest that a greater or lesser number of registers can be used for register queue 30 and that the number of lines for MUXes, DEMUXes, adders, and subtracters, and the number of gates and flip-flops must be adjusted accordingly. The details of making those adjustments are apparent to a person of ordinary skill in the art, and have been left out. In addition, the width of busses can be adjusted to accommodate different lengths of VLIW packets and program counters, for example.

Continuing with FIG. 3, "select next instruction" block 70 includes MUX 72. As stated above, FIG. 3 shows only a portion of "select next instruction" block 70. The remaining portions of "select next instruction" block 70 that are not shown in FIG. 3 are shown in FIG. 2. The portions of "select next instruction" block 70 that are shown in FIG. 2 are explained above in connection with FIG. 2.

One input of MUX 72, labeled "0" in FIG. 2 is connected to 160 bit wide bus 31. The corresponding enable line of MUX 72, also labeled "0" in FIG. 3, is "select register_queue" signal 76. The other input of MUX 72 is not shown in FIG. 3, but is shown in FIG. 2 above. The output of MUX 72 is connected to 160 bit wide bus 71. One function of MUX 72 is to transfer a VLIW bundle, which in the example used in the present application is 160 bits long, from 160 bit wide bus 31 to 160 bit wide bus 71 when select_register_queue signal 76 goes high. As shown in FIG. 3, bus 71 is connected to instruction decode unit 90.

As shown in FIG. 3, "select next instruction" block 70 has access to any VLIW bundle from register queue 30. When it is desired to execute a VLIW bundle from register queue 30, i.e. the desired VLIW bundle has already been fetched from program memory and is held in register queue 30, select_register_queue signal 76 is set high. Exactly one of increment_access signal 67, repeat_access signal 68, or branch signal 69 is also set high. Branch signal 69 is set high only when the desired branch interval has been determined for the value of branch interval 63, which appears at the input of subtracter 62.

On clock cycle c1, the inputs of MUX 56 are updated according to the previous value of access signal 53. The new value of access signal 53 appears at the output of MUX 56, which is the input of DEMUX 52, according to which one of increment_access signal 67, repeat_access signal 68, or branch signal 69 is set high. In other words, the access pointer of register queue 30 is adjusted to the desired access position in clock cycle c1. Then at clock cycle c2, DEMUX 52 enables the output of the register pointed to by the access pointer of register queue 30, and the desired VLIW bundle is output to bus 31. Since clock cycle c1 occurs before clock cycle c2, the access pointer, access signal 53, is updated just before a desired VLIW bundle is output from register queue 30 to bus 31. Thus, "select next instruction" block 70 selects the desired VLIW bundle and passes the selected VLIW bundle to instruction decode unit 90. As stated above, instruction decode unit 90 performs the decoding required prior to execution of the VLIW instruction packet contained in the desired VLIW bundle.

Figure 4:
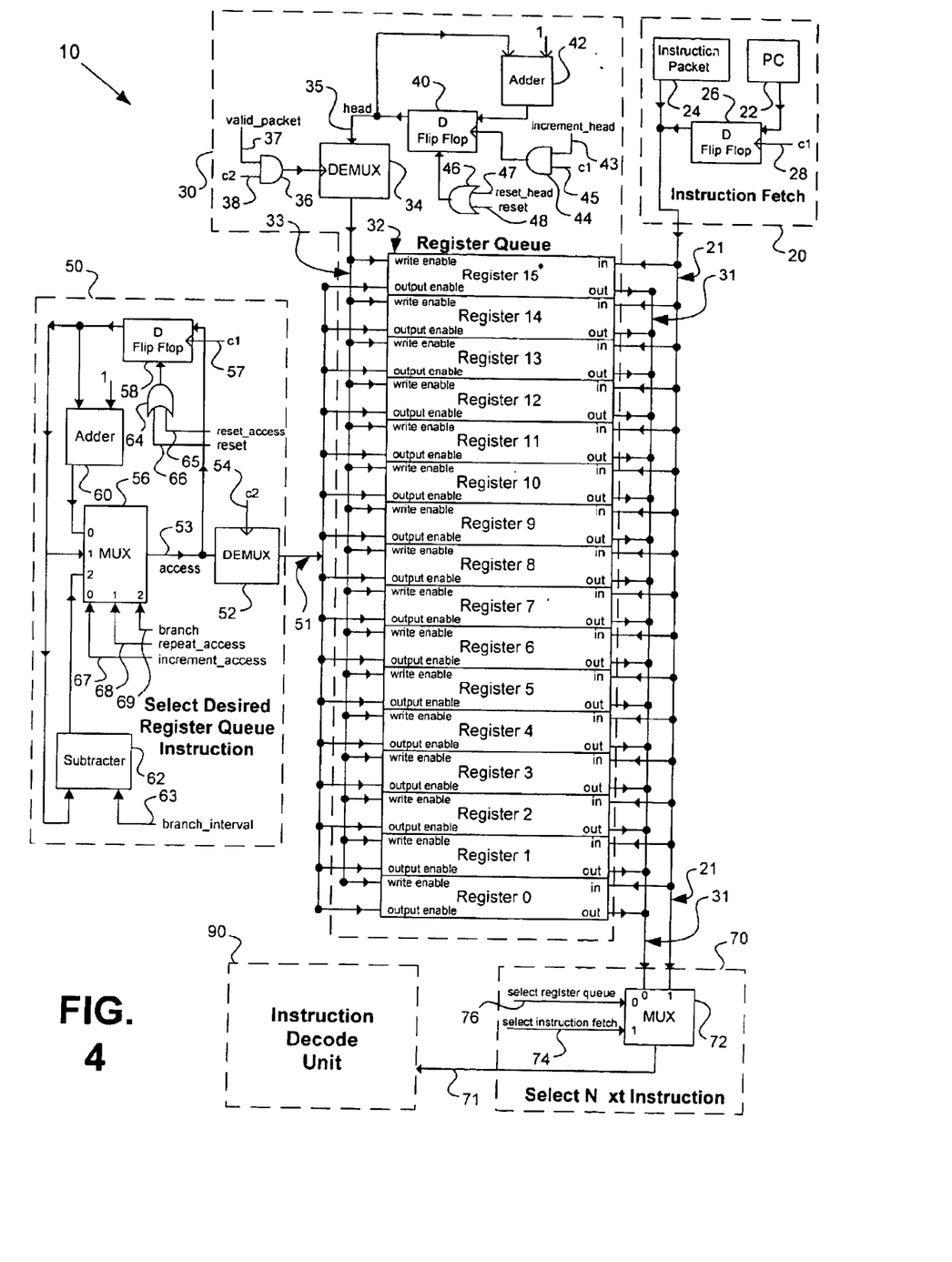
FIG. 4 is a circuit block diagram which combines FIGS. 2 and 3 to illustrate an one specific implementation of the system of FIG. 1.

FIG. 4 is a circuit block diagram which combines FIGS. 2 and 3 to illustrate to one embodiment of instruction pre-fetch queuing system 10 of FIG. 1. FIG. 4 shows "instruction fetch" block 20 as it is shown in FIG. 2. FIG. 4 also shows "select desired register queue instruction" block 50 as it is shown in FIG. 3.

FIG. 4 shows both register queue 30 and "select next instruction" block 70 in complete detail by showing all those features of register queue 30 and "select next instruction" block 70 which are shown in either of FIG. 2 or FIG. 3.

Thus, register queue 30 shows both the write enable and output enable connections to each of the registers in circular register bank 32. That is, register queue 30 shows the connections of circular register bank 32 to both line 33 and line 51. Register queue 30 also shows write enable support logic including DEMUX 34, head signal 35, AND gate 36, valid_packet signal 37, c2 clock signal 38, D flip-flop 40, adder 42, increment_head signal 43, AND gate 44, c1 clock signal 45, OR gate 46, reset_head signal 47 and reset signal 48. Register queue 30 further shows both the input and output lines to each of the registers in circular register bank 32. That is, register queue 30 shows the connections of circular register bank 32 to both bus 21 and bus 31.

"Select next instruction" block 70 shows MUX 72 and the connections of both inputs of MUX 72 to bus 21 and to bus 31. "Select next instruction" block 70 also shows both enable lines of NM 72, select_register_queue signal 76 and select_instruction_fetch signal 74. "Select next instruction" block 70 also shows the output of MUX 72 connected to 160 bit wide bus 71. As shown in FIG. 4, 160 bit wide bus 71 is connected to instruction decode unit 90.

Thus, it can be seen that the operation of instruction pre-fetch queuing system 10 is as described above in connection with both of FIGS. 2 and 3. That is, for example, when it is desired to execute an VLIW bundle directly from "instruction fetch" block 20, i.e. the desired VLIW bundle is to be newly fetched from program memory, select_instruction_fetch signal 74 is set high. Increment_head signal 43 and valid_packet signal 37 are also set high. The desired VLIW bundle is written to the new head of register queue 30, i.e. register queue 30 is updated to hold the desired VLIW bundle at the head of register queue 30. Thus, since the VLIW instruction packet in the desired VLIW bundle is about to be executed, register queue 30 will always contain the 16 most recently executed VLIW bundles. Since select_instruction_fetch signal 74 is set high, "select next instruction" block 70 selects the desired VLIW bundle from "instruction fetch" block 20 and passes the selected VLIW bundle to instruction decode unit 90. Instruction decode unit 90 performs the decoding required prior to execution of the VLIW packet contained in the desired VLIW bundle.

Continuing with the example, when it is desired to execute a desired VLIW packet from register queue 30, i.e. the desired VLIW bundle has already been fetched from program memory and is held in register queue 30, select register queue signal 76 is set high. Exactly one of increment_access signal 67, repeat_access signal 68, or branch signal 69 is also set high. Branch signal 69 is set high only when the desired branch interval has been determined. The access pointer of register queue 30 is updated to the desired access position, and the desired VLIW bundle is output to bus 31. Since select register queue signal 76 is set high, "select next instruction" block 70 selects the desired VLIW bundle from register queue 30 and passes the selected VLIW bundle to instruction decode unit 90. Instruction decode unit 90 performs the decoding required prior to execution of the VLIW instruction packet contained in the desired VLIW bundle.

It is appreciated by the above detailed description that the invention provides a method for reducing power when fetching instructions in a processor and related apparatus. The method provides reduced power consumption in fetching VLIW instruction packets, particularly when short "repeat loops" are frequently executed. Although one embodiment of the present invention is described with reference to an example of short repeat loops commonly encountered in digital signal processing (DSP) algorithms, short repeat loops are commonly encountered in many other types of algorithms and applications. For example, short repeat loops are commonly encountered in algorithms used for telecommunications and multimedia processing. The invention can be used in any type of application which requires frequent repetitive processing. Although the invention is described as applied to the central processing unit of a VLIW processor intended to be used for digital signal processing, it will be readily apparent to a person of ordinary skill in the art how to apply the invention in similar situations where substantial reduction of power consumption for instruction fetching in digital processors is needed.

From the above description of the invention it is manifest that various techniques can be used for implementing the concepts of the present invention without departing from its scope. For example, although the particular embodiment of the present invention described here is applied to VLIW processors, the invention is also applicable to other types of processor architectures such as, for example, single instruction multiple data ("SIMD") processors or conventional processors using a wide instruction bus. Moreover, while the invention has been described with specific reference to certain embodiments, a person of ordinary skill in the art would recognize that changes can be made in form and detail without departing from the spirit and the scope of the invention. For example, although the particular embodiment of the present invention described here uses a register queue with 16 registers, any greater or lesser number of registers can be used. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, method for reducing power when fetching instructions in a processor and related apparatus have described.

What is claimed is:

1. A method in a processor comprising steps of:
   identifying an instruction loop having a plurality of instructions:
   fetching said plurality of instructions from a program memory;
   storing said plurality of instructions in a register queue comprising a plurality of resisters;
   determining whether said processor requires execution of said instruction loop;
   outputting said plurality of instructions from said register queue when said processor requires execution of said instruction loop;
   executing said plurality of instructions, wherein said executing step comprises:
      executing at least one instruction stored in a first register of said plurality of registers,
      setting an increment_access signal to execute at least one instruction stored in a second register of said plurality of registers wherein said second register is immediately in sequence after said first register.

2. The method of claim 1 wherein each of said plurality of instructions in said instruction loop is a VLIW packet.

3. The method of claim 1 wherein storing one of said plurality of instructions in said register queue comprises steps of:
   adjusting a head pointer to point to a selected register in said register queue;
   writing said one of said plurality of instructions into said selected register.

4. The method of claim 1 wherein said register queue contains a most recently executed plurality of instructions.

5. The method of claim 1 wherein said step of determining whether said processor requires execution of said instruction loop comprises checking a PC value.

6. The method of claim 1 wherein outputting one of said plurality of instructions from said register queue comprises steps of;
   adjusting an access pointer to point to a selected register in said register queue;
   outputting said one of said plurality of instructions from said selected register.

7. The method of claim 6 wherein said access pointer is held constant.

8. The method of claim 6 wherein said access pointer is incremented by one.

9. The method of claim 6 wherein said access pointer is decremented by a branch interval.

10. The method of claim 1 wherein said program memory comprises a cache.

11. The method of claim 1 wherein said program memory comprises an external memory.

12. A circuit in a processor comprising:
   an instruction fetch module configured to fetch a plurality of instructions, said plurality of instructions belonging to an instruction loop in a program memory:
   a register queue configured to store said plurality of instructions, said register queue comprising a plurality of registers;
   a tracking module configured to keep track of a desired instruction in said instruction loop;
   circuitry for setting an increment access signal to execute at least one instruction stored in a second register of said plurality of resistors, wherein said second resister is immediately in sequence after a first register of said plurality of registers for which at least one instruction stored therein has just been executed;
   an output module configured to output said desired instruction for decoding and execution by said processor.

13. The circuit of claim 12 wherein each of said plurality of instructions belonging to said instruction loop is a VLIW packet.

14. The circuit of claim 12 wherein said tracking module comprises a head pointer configured to point to a selected register in said register queue, wherein said selected register stores said desired instruction.

15. The circuit of claim 12 wherein said register queue is configured to contain a most recently executed plurality of instructions.

16. The circuit of claim 12 wherein said instruction fetch module checks a PC value to determine whether said processor requires fetching and execution of said instruction loop.

17. The circuit of claim 12 wherein said output module comprises an access pointer, said access pointer being configured to point to a selected register in said register queue, wherein said selected register outputs said desired instruction.

18. The circuit of claim 17 wherein said access pointer is held constant.

19. The circuit of claim 17 wherein said access pointer is incremented by one.

20. The circuit of claim 17 wherein said access pointer is decremented by a branch interval.

21. The circuit of claim 12 wherein said program memory comprises a cache.

22. The circuit of claim 12 wherein said program memory comprises an external memory.

23. A method in a processor comprising steps of:

identifying a loop having a plurality of VLIW packets;

fetching said plurality of VLIW packets from a program memory;

storing said plurality of VLIW packets in a register queue comprising plurality of registers;

determining whether said processor requires execution of said loop;

outputting said plurality of VLIW packets from said register queue when said processor requires execution of said loop;

executing said plurality of VLIW packets, wherein said executing step comprises:

executing at least one instruction stored in a first resister of said plurality of registers, setting an increment access signal to execute at least one instruction stored in a second register of said plurality of resisters, wherein said second register is immediately in sequence after said first register.

24. The method of claim 23 wherein storing one of said plurality of VLIW packets in said register queue comprises steps of:

adjusting a head pointer to point to a selected register in said register queue;

writing said one of said plurality of VLIW packets into said selected register.

25. The method of claim 23 wherein said register queue contains a most recently executed plurality of VLIW packets.

26. The method of claim 23 wherein said step of determining whether said processor requires execution of said loop comprises checking a PC value.

27. The method of claim 23 wherein outputting one of said plurality of VLIW packets from said register queue comprises steps of:

adjusting an access pointer to point to a selected register in said register queue;

outputting said one of said plurality of VLIW packets from said selected register.

28. The method of claim 27 wherein said access pointer is held constant.

29. The method of claim 27 wherein said access pointer is incremented by one.

30. The method of claim 27 wherein said access pointer is decremented by a branch interval.

31. The method of claim 23 wherein said program memory comprises a cache.

32. The method of claim 23 wherein said program memory comprises an external memory.

* * * * *